United States Patent [19]

McLennan

[11] 4,093,307
[45] June 6, 1978

[54] VEHICLE RESTRAINING BELT STRUCTURE

[76] Inventor: Ronald A. McLennan, 520 Maple Row, Elkhart, Ind. 46514

[21] Appl. No.: 734,870

[22] Filed: Oct. 22, 1976

[51] Int. Cl.² ............................................. A62B 35/00
[52] U.S. Cl. .................................................. 297/385
[58] Field of Search .............. 297/384, 220, 385, 387; 2/DIG. 6; 128/133, 134

[56] References Cited

U.S. PATENT DOCUMENTS

| | | | |
|---|---|---|---|
| 1,366,798 | 1/1921 | Harris | 297/385 X |
| 1,712,198 | 5/1929 | Clapp | 297/387 |
| 2,649,236 | 8/1953 | Vaccari et al. | 297/385 |
| 2,739,642 | 3/1956 | Riedell | 297/385 |
| 2,871,927 | 2/1959 | Niateri | 297/385 |
| 3,136,311 | 6/1964 | Lewis | 2/DIG. 6 |
| 3,160,143 | 12/1964 | Gray | 2/DIG. 6 |
| 3,385,633 | 5/1968 | Aizley | 297/385 X |
| 3,560,048 | 2/1971 | Flint | 297/385 X |
| 3,804,458 | 4/1974 | Jannoni | 297/220 |
| 3,827,716 | 8/1974 | Vaughn et al. | 297/385 X |

Primary Examiner—James T. McCall
Attorney, Agent, or Firm—Marmaduke A. Hobbs

[57] ABSTRACT

A vehicle safety belt structure for use with a seat having a back, in which two laterally extending straps are attached to a body portion and extend around the passenger. The body portion is supported on the back of the vehicle seat and the straps are so positioned with respect to an adult passenger that they overlap the lower rib cage and the upper abdomen and give support to the body while restraining the passenger in the event of a sudden stop or accident. The two straps are preferably connected to one another around the body of the passenger by a Velcro fastener, and an upper portion attached to the body may be secured to the upper part of the back by a fixture which permanently holds the belt structure in place on the back of the set. The safety belt structure gives a firm support to the body without holding or cramping the hips, lower back and upper part of the legs of the passenger in a firm position, and may be positioned on the passenger to provide, in effect, a lifting action or supporting effect to the mid and upper body portion of the passenger.

9 Claims, 13 Drawing Figures

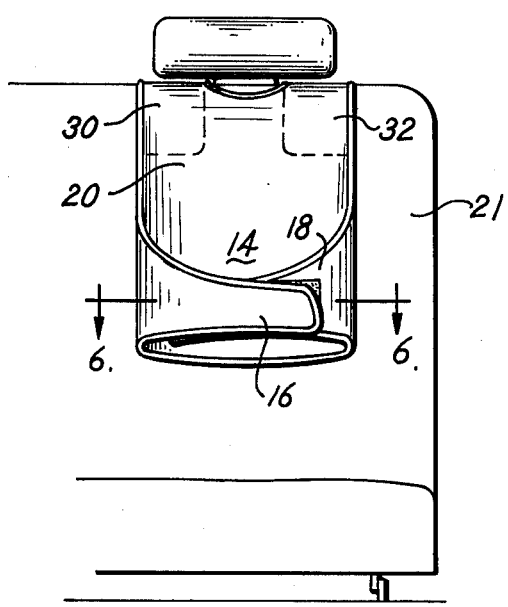
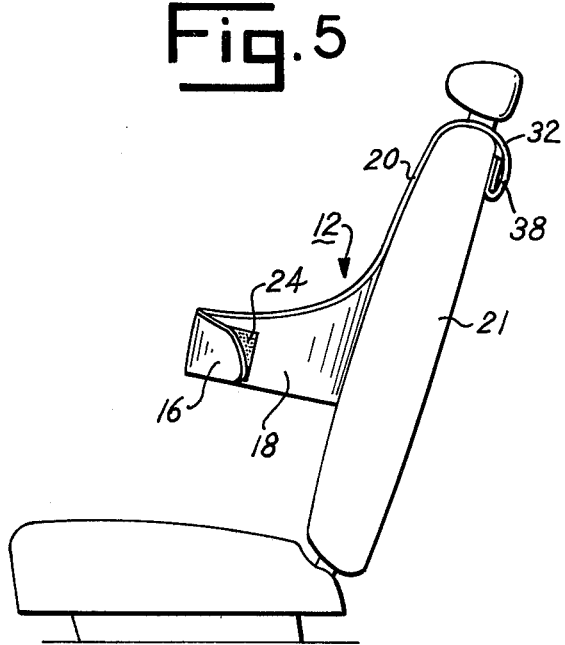
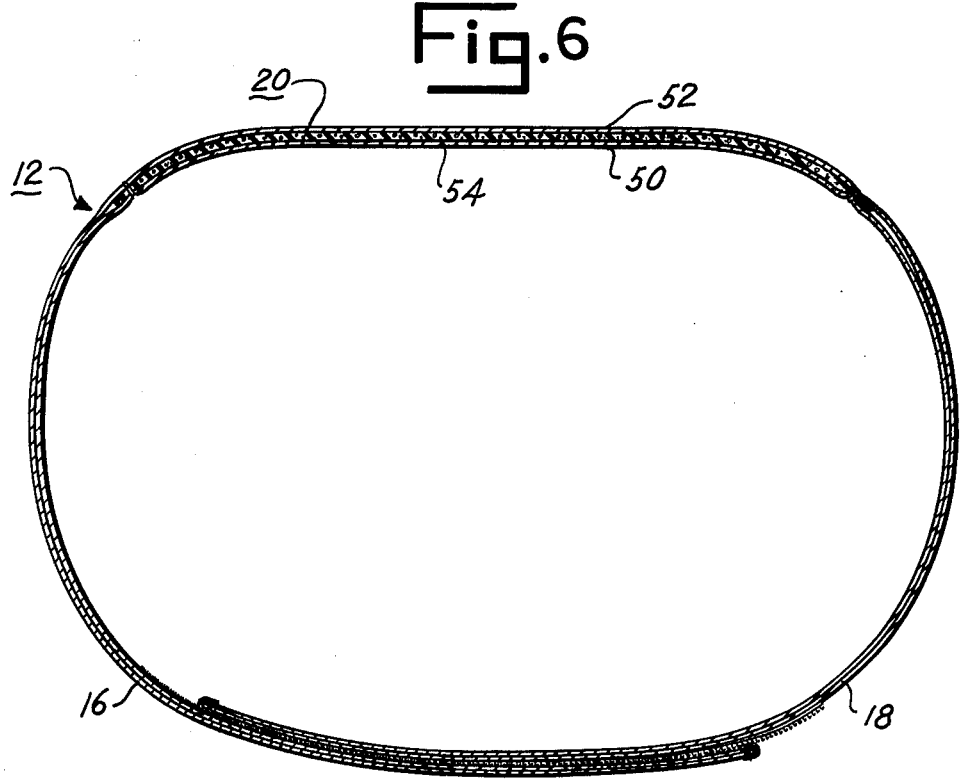

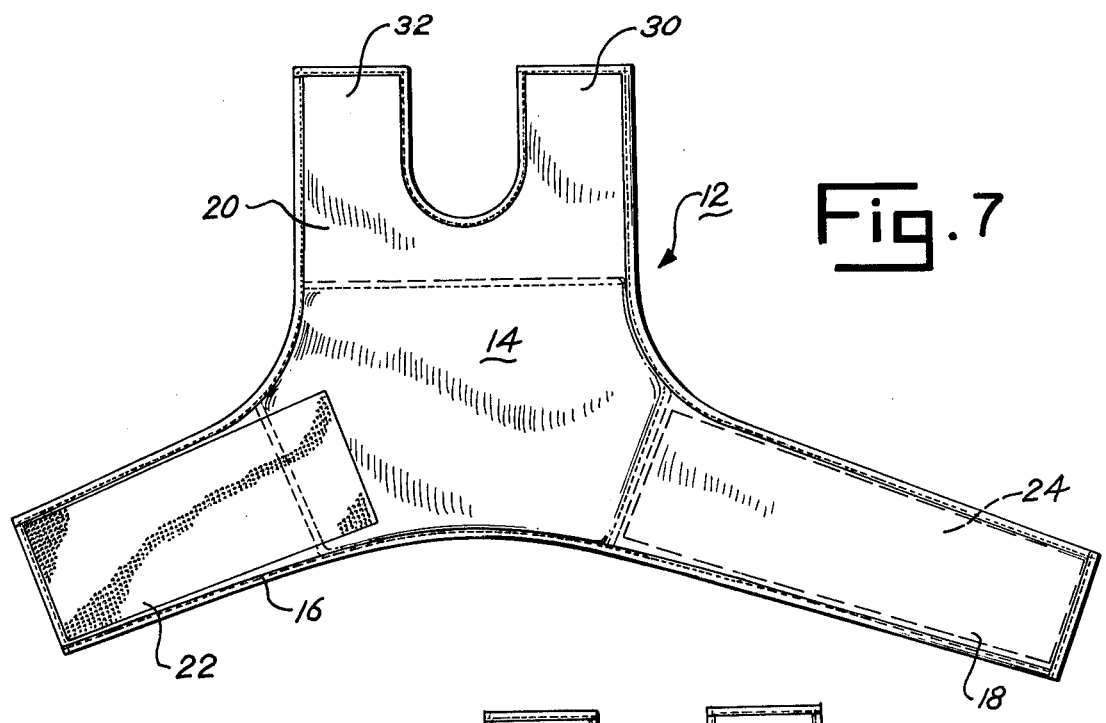
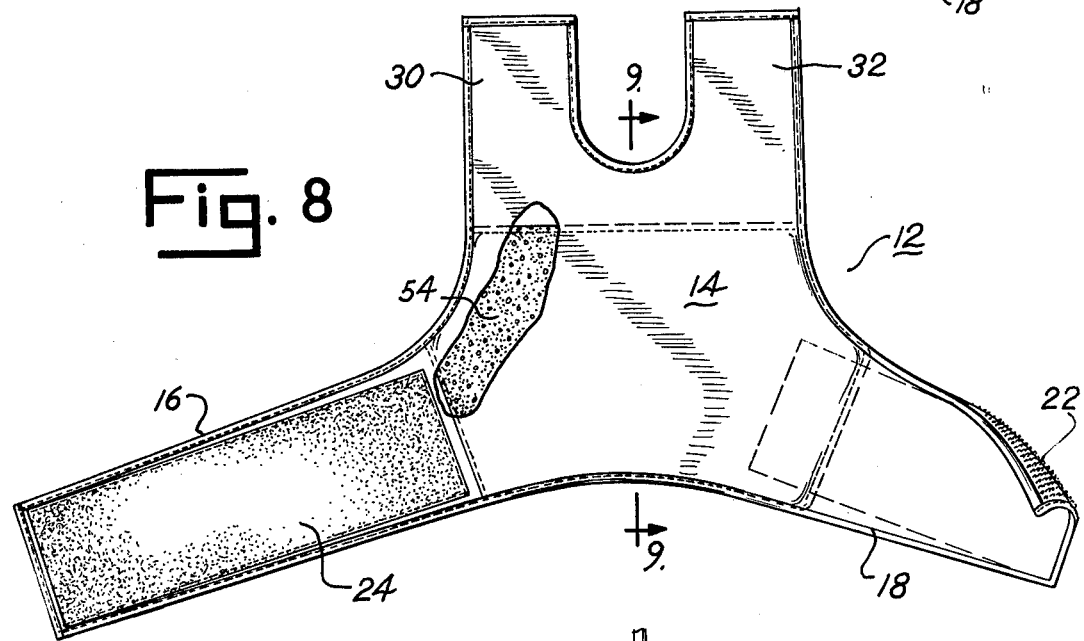
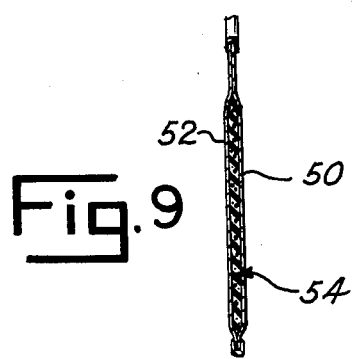

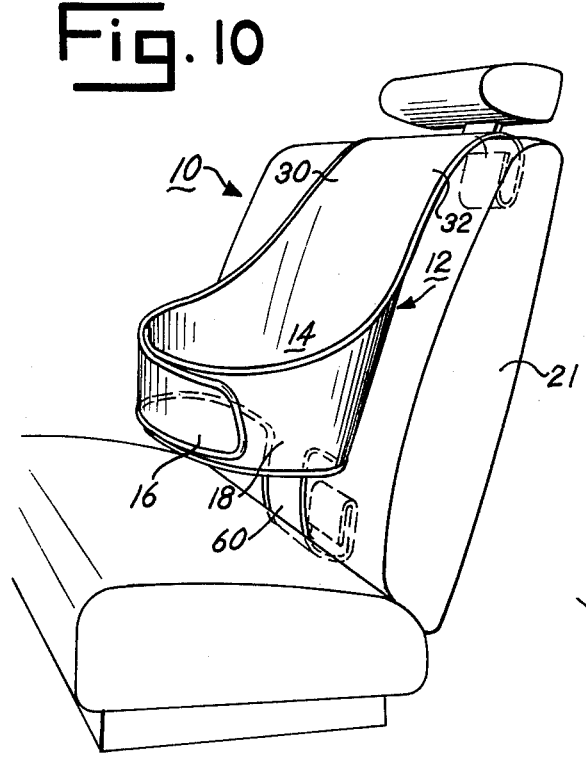
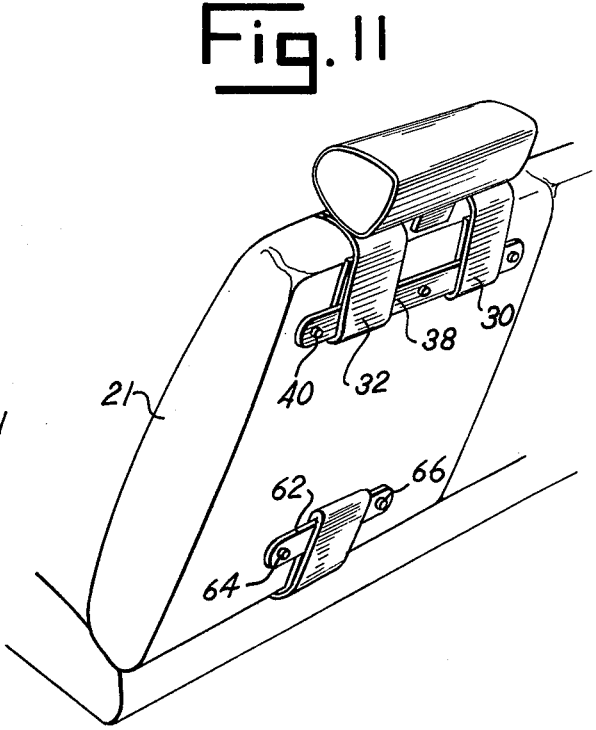
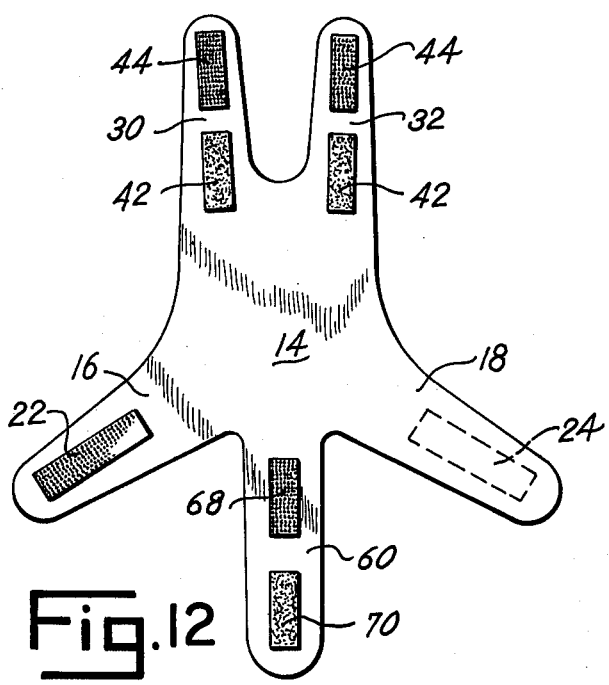
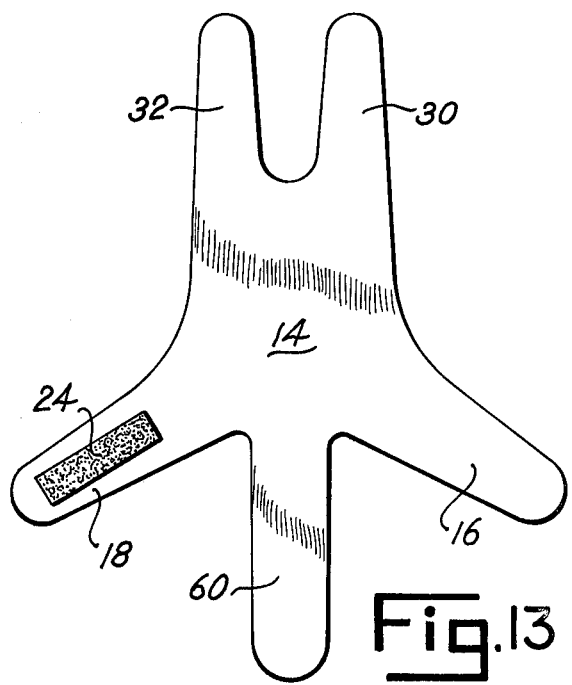

VEHICLE RESTRAINING BELT STRUCTURE

The conventional safety belts or harnesses used today consist of a lap belt which extends from each side of the seat and embraces the hips of the passenger, and a shoulder strap which is usually attached at one end to the lap belt or the buckle therefor and anchored at the other end to the top or side post of the vehicle. This type of harness, while providing significant safety to the passenger, is generally uncomfortable and restrictive to the movement of the body, without providing any appreciable support to the lower part of the body and normally none at all to the upper part of the body while the passenger is riding in the vehicle, although both the belt and strap will restrain the passenger during an accident, often preventing serious injury to the passenger. In order to be prepared for an accident, the passenger must wear the belt and strap at all times while riding in the vehicle and is therefore constantly uncomfortable to some degree. This is particularly true on long trips, in that the hips, lower back and upper part of the legs are virtually held in a fixed position and do not receive sufficient movement or exercise to maintain proper circulation of blood and other body fluids in those parts. This uncomfortable restraint causes substantial amount of fatigue and sometimes temporary pain in those parts. This condition in itself can be a driving hazard. It is therefore one of the principal objects of the present invention to provide a vehicle safety belt structure which not only provides effective restraining effect in case of an accident but also gives support to the upper body portion of the passenger without restricting essential movements of the hips, lower back and upper part of the legs, and which can easily be adjusted to the individual's size and readily released if the situation requires quick escape from the vehicle.

Another object of the invention is to provide a safety belt structure which embraces the mid section of the body, including the lower portion of the rib cage, to provide in effect a lifting or supporting action on the passenger without imparting a fixed restraint on the lower part of the body of the type normally causing fatigue and even pain around the hip region, and which can easily be adjusted from time to time to permit the body to assume different positions in the seat without sacrificing safety in the event of an accident.

Still another object of the invention is to provide a safety belt structure of the aforesaid type, which can easily be installed in all standard automotive vehicles of various makes without changing the basic structure or design, and which can be constructed of a variety of different materials which blend with the decor of the vehicle interior.

Additional objects and advantages of the present invention will become apparent from the following description and accompanying drawings, wherein:

FIG. 4 is a front elevational view of the seat structure and a fragmentary view of the seat on which the belt structure is mounted;

FIG. 5 is a side elevational view of the seat and safety belt structure;

FIG. 6 is a horizontal cross sectional view of the safety belt structure, the section being taken on line 6 — 6 of FIG. 4;

FIG. 7 is a front elevational view of the safety belt shown in the preceding figures;

FIG. 8 is a rear elevational view of the safety belt structure shown in FIG. 7;

FIG. 9 is a cross sectional view of the safety belt structure, the section being taken on line 9 — 9 of FIG. 8;

FIG. 10 is a perspective view of a modified form of the safety belt structure showing it mounted on a seat;

FIG. 11 is a perspective view of the rear portion of the seat shown in FIG. 10, illustrating the manner in which the modified safety belt structure is mounted on the seat; and FIGS. 12 and 13 are front and back elevational views, respectively, of the modified form of the seat belt structure shown in FIGS. 10 and 11.

Figure 1:
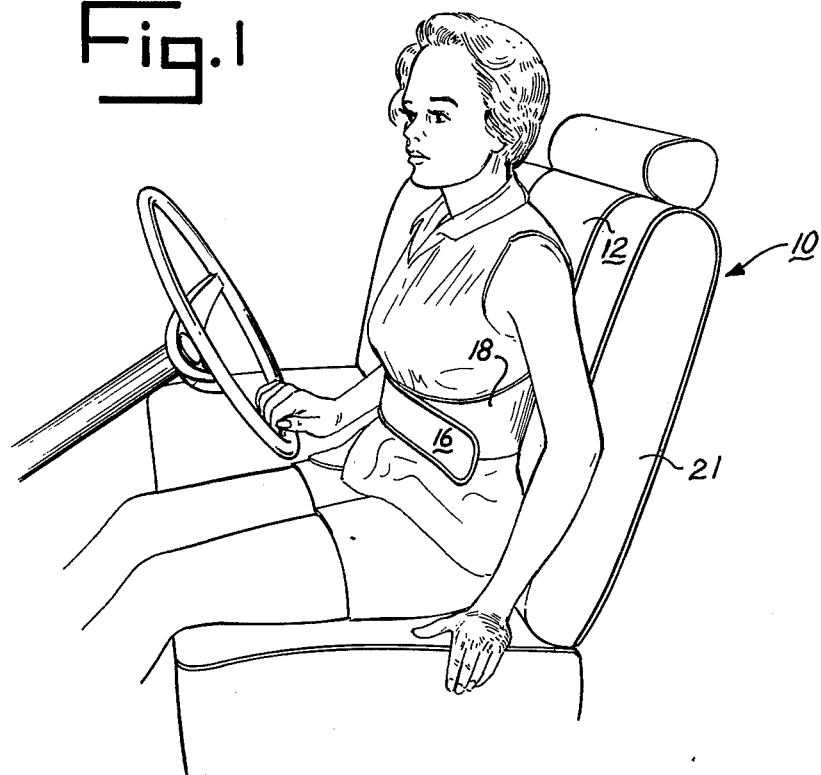
FIG. 1 is a perspective view of a car seat showing the driver sitting therein, with the present safety belt structure around the driver.

Referring more specifically to the drawings, FIG. 10 designates generally a driver's seat of an automobile, and numeral 12 indicates a safety belt structure embodying the present invention, the safety belt structure being shown mounted on the seat and supporting and/or restraining the driver. For the convenience of description in the application, both before and hereinafter, the person whether driver or passenger in the automobile will be referred to as a "passenger" and this term is intended to refer to the one using the seat belt structure, regardless of which seat or position he occupies in the vehicle.

The seat belt structure includes a body 14, waist straps 16 and 18 secured to body 14 and extending generally laterally therefrom on opposite sides, and an upper portion 20 attached to the upper edge of the body and extending upwardly therefrom for securing the structure to back 21 of the seat. The belt structure may be of a variety of different materials, including vinyl, fabric or other flexible sheet material of substantial strength, and preferably the two straps 16 and 18 and upper portion 20 are formed integrally with body 14 as one piece, although they may be made in separate parts and sewed or otherwise secured to the body.

Figure 2:
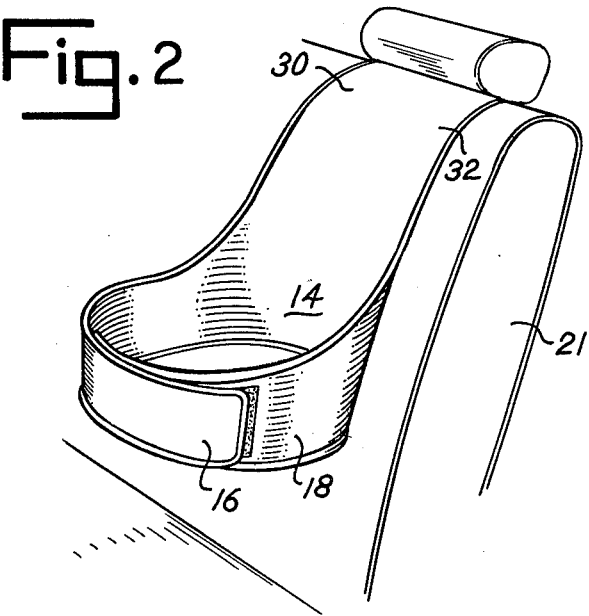
FIG. 2 is a perspective view of a portion of the seat and the safety belt structure shown in FIG. 1.

Straps 16 and 18 are preferably relatively wide and are designed to fit around the waist of an adult passenger, overlapping the upper portion of the abdomen and the lower portion of the rib cage, and extending angularly downwardly from the body to give optimum comfort, support and safe restraint to the passenger when the straps are secured in place around the passenger's body. The two straps are secured together when they are around the passenger, by interengaging securing elements 22 and 24, element 22 consisting of numerous small plastic hook-like members, and element 24 consisting of a matted or woven fiber material such as felt. When the two parts are pressed together, the hook-like members attach themselves to the fibers of the flet structure of element 24, thus securing the two straps together. This type of securing means is well known and generally referred to as "Velcro", and will hereinafter be referred to by this name. When the straps are overlapped in the manner illustrated in FIGS. 1, 2, 4 and 5, and pressed together with the securing elements in contact with one another, the straps are held securely together and will not release the passenger until the outer end of strap 16 is pulled forwardly and away from strap 18, thus in effect peeling the two securing elements apart. Other types of securing means may be used, such as hooks and holes, or snap buttons; however, these have not proved as satisfactory as the Velcro strips since they are not as versatile or reliable for this application.

Figure 3:
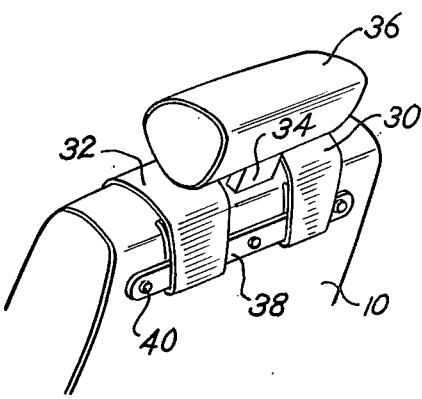
FIG. 3 is a fragmentary perspective view of the upper part of the seat and safety belt structure showing one manner of anchoring the belt structure to the seat.

Various means and methods may be used to secure the safety belt structure to the seat, FIGS. 1 through 9 illustrating one satisfactory embodiment. In this embodiment the upper portion 20 is of a generally U-shaped structure having upwardly projecting arms 30 and 32 which extend over the top of the seat back on either side of the support bar 34 of head rest 36. The two arms then extend downwardly along the upper part of the seat back are attached to a bar-like fixture 38 secured to the back of the seat by a plurality of bolts or screws 40, the two arms extending beneath the bar and the ends thereof folding under the respective arm and being attached thereto, preferably by Velcro strips, such as those seen at numerals 42 and 44 in FIG. 12. However, in the embodiment illustrated, when the screws are tightened, no additional securing means, such as Velcro, are required, since the bar fixture clamps the two arms firmly in place. The safety belt structure remains in place on the seat for use by the passenger and is normally not removed from the seat, although in some special situations the belt structure may be adjusted upwardly or downwardly with respect to the passenger if desired.

In the embodiment of the invention just described, body 14 consists of a front layer 50 and a back layer 52 spaced from one another by a thin layer of foam rubber 54 or other light padding, and the two layers are sewed or otherwise secured to one another along the edges with foam rubber layer being held firmly in place between the layers. The two layers extend outwardly to form straps 16 and 18 and upwardly to form upper portion 20, and are secured together throughout at their edges by sewing or other suitable securing means. The Velcro hook and felt elements are normally produced as a strip or a layer of material and each layer of material is sewed, cemented or otherwise secured to the respective inner and outer sides of the two straps 16 and 18.

In the use and operation of the present vehicle safety belt structure of the embodiment shown in FIGS. 1 through 9, the upper portion is secured to the back of the upper part of the seat back by a bar fixture 38, and body 14 rests on the front of the seat back. When the passenger enters the vehicle and sits down in the seat, the two straps 16 and 18 are placed around the body of the passenger at the lower part of the rib cage and upper part of the abdomen, and pulled sufficiently tight that the two straps preferably firmly engage the body of the passenger. However, the straps are not intended to bind the passenger, although for effective body support, the two straps must be firmly placed around the passenger's body. After the two straps are placed around the body, the Velcro elements are pressed together to hold the two straps together. Since the belt structure is placed around the midsection of the passenger's body and is supported at the top of the seat back, the belt structure gives effective body support to the passenger throughout the normal operation of the vehicle without binding or holding the hips, lower back and upper part of the legs in a fixed or firm position. Further, since the present belt structure overlaps the rib cage, the upper body of the passenger is held in an upright position and prevented from being thrown forward in the event of a sudden stop or a front end collision. The position of the strap, when firmly placed around the body, relieves the constant pressure from weight on the lower part of the passenger's body, thus providing a degree of comfort which permits long trips in the seat without undue fatigue. When the passenger wishes to leave the vehicle, the strap 16 is pulled forwardly and to the right as viewed in FIG. 1, thus disengaging the hook element from the felt element and releasing the two straps, thus permitting the passenger to leave the seat in the normal manner. Since the Velcro can be secured together in various overlapping positions, the safety belt structure is readily adaptable to people of various sizes without any other adjustment of the structure being required for optimum comfort and safety.

In the embodiments of the invention illustrated in FIGS. 10 through 13, the basic structure is essentially the same as that shown and described with reference to the embodiment of FIGS. 1 through 9; consequently, like numerals will refer to like parts in the embodiments and, since the structures are basically the same, the details of the embodiment in FIGS. 10 through 13 will not be specifically described. In this embodiment a hold down strap 60 extends downwardly from the body 14 between straps 16 and 18 and extends under the back of the seat to a position along the lower edge of the back where it is secured to fixture 62, the fixture being secured to the seat by screws 64 and 66, or to the body of the car when used on the rear seat or when used on the car front seat which folds forwardly. Strap 60 preferably has Velcro elements 68 and 70 for engaging one another after the free end of the strap has been placed over bar fixture 62. The strap 60 more firmly holds the body 14 of the belt structure in place. Since the seat back of most modern cars is either permanently held or latched in an upright position, attachment of the seat belt structure to the seat back forms a firm anchor for either of the embodiments of the invention described herein. The embodiment disclosed in FIGS. 10 through 13 is used in essentially the same way as that described with reference to the embodiment of FIGS. 1 through 9, in that in this embodiment, as in the previous one described herein, the two straps 16 and 18 are firmly attached to body 14 and are held together by Velcro.

While only two embodiments of the present vehicle safety belt structure have been described in detail herein, various changes and modifications may be made without departing from the scope of the invention.

In all embodiments it is advisable to include a strap or other means for holding the lower part of body 14 down so that in the event of an up-set of the vehicle the body and straps are held in place in the seat. A pair of straps or cords extending downwardly to the lower corners of the seat back could be used, as well as strap 60 in the first embodiment described herein. These straps can be anchored to the floor of the vehicle body. Further, both embodiments of the invention can be built into the seat back and made adjustable by a mechanism in the back, particularly if the safety belt structure is included as original equipment of the vehicle.

I claim:

1. A passenger restraining belt structure for use with a vehicle seat having a back, comprising a body for engaging the front of the back of the seat, straps connected to said body and extending laterally therefrom, with both the top and bottom edges of each strap extending downwardly, to a position near the midsection of an adult passenger for overlapping one another in front of the passenger and at least partially supporting the weight of the passenger's body, the top and bottom edges of each strap extending generally in a parallel direction and the top edge being the normal position of the passenger's arm pit, means for securing said straps together with the straps around the body of the passenger, an upper portion attached to said body for extending over the top of the back of the seat, and means for attaching said upper portion to the back of the seat back.

2. A passenger restraining belt structure as defined in claim 1 in which said back and straps are constructed of flexible sheet material.

3. A passenger restraining belt structure as defined in claim 1 in which said means for securing said straps together consists of an element of numerous plastic hooks on one strap facing toward the other strap when in position around the passenger and an element of felt-like material connected to the other strap and facing toward the strap having the plastic hooks for engagement therewith.

4. A passenger restraining belt structure as defined in claim 1 in which said upper portion is attached to the upper edge of the body and consists of two laterally spaced arms for extending over the top of the back of the seat and a bar-like fixture connects the arms to the back of the seat back near the upper portion thereof.

5. A passenger restraining belt structure as defined in claim 1 in which said laterally extending straps are relatively wide for overlapping the lower portion of the rib cage and upper portion of the abdomen of the passenger when the two straps are secured together.

6. A passenger restraining belt structure as defined in claim 3 in which said laterally extending straps extend angularly downwardly and outwardly from said body and are relatively wide for overlapping the lower portion of the rib cage and upper portion of the abdomen of the passenger when the two straps are secured together.

7. A passenger restraining belt structure as defined in claim 6 in which said body, straps and upper portion are constructed of flexible sheet material.

8. A passenger restraining belt structure as defined in claim 1 in which a third strap extends substantially directly downwardly from said body for securement to an anchor near the bottom of the seat back.

9. A passenger restraining belt structure as defined in claim 7 in which a third strap extends substantially directly downwardly from said body for securement to an anchor near the bottom of the seat back.

* * * * *